United States Patent [19]
Bach et al.

[11] 3,747,473
[45] July 24, 1973

[54] CLOSED CENTER BOOSTER WITH TWO-STAGE HYDRAULIC REACTION

[75] Inventors: Lloyd G. Bach; Jerome T. Ewald, both of South Bend, Ind.

[73] Assignee: The Bendix Corporation, South Bend, Ind.

[22] Filed: Mar. 18, 1971

[21] Appl. No.: 125,655

[52] U.S. Cl. .................. 91/373, 91/376, 91/417 R
[51] Int. Cl. .................... F15b 9/10, F15b 15/17
[58] Field of Search ................ 91/370, 371, 372, 91/373, 369 B, 376, 417

[56] References Cited
UNITED STATES PATENTS

| | | | |
|---|---|---|---|
| 2,761,427 | 9/1956 | Shumaker | 91/373 |
| 3,035,552 | 5/1962 | Hill | 91/373 |
| 3,054,387 | 9/1962 | Kellogg | 91/373 |
| 3,165,031 | 1/1965 | Rockwell | 91/369 B |

FOREIGN PATENTS OR APPLICATIONS

| | | | |
|---|---|---|---|
| 938,575 | 10/1963 | Great Britain | 91/372 |

Primary Examiner—Paul E. Maslousky
Attorney—Ken C. Decker and Plante, Hartz, Smith & Thompson

[57] ABSTRACT

A hydraulic brake booster is disclosed which includes a housing defining a bore therewithin, a boost piston which is slidably mounted in the bore and cooperates with one end of the latter to define a pressure chamber between the piston and the end of the bore, and a valve which controls fluid communication between a pressure source and the pressure chamber. A valve actuation rod is controlled by the vehicle operator and includes an inner member for operating the valve and an outer member which is responsive to the fluid pressure level in the chamber to transmit reaction forces to the vehicle operator, thereby providing brake "feel". The outer member is effective to transmit reaction forces only when the pressure level in the pressure chamber exceeds a predetermined value. Therefore, when the vehicle operator initially applies the brakes of the vehicle, only a very small reaction force will be transmitted through the valve operating rod. However, when the pressure level in the pressure chamber exceeds the predetermined value, a substantially greater portion of the force generated by the fluid pressure in the pressure chamber is transmitted to the vehicle operator.

3 Claims, 1 Drawing Figure

PATENTED JUL 24 1973
3,747,473
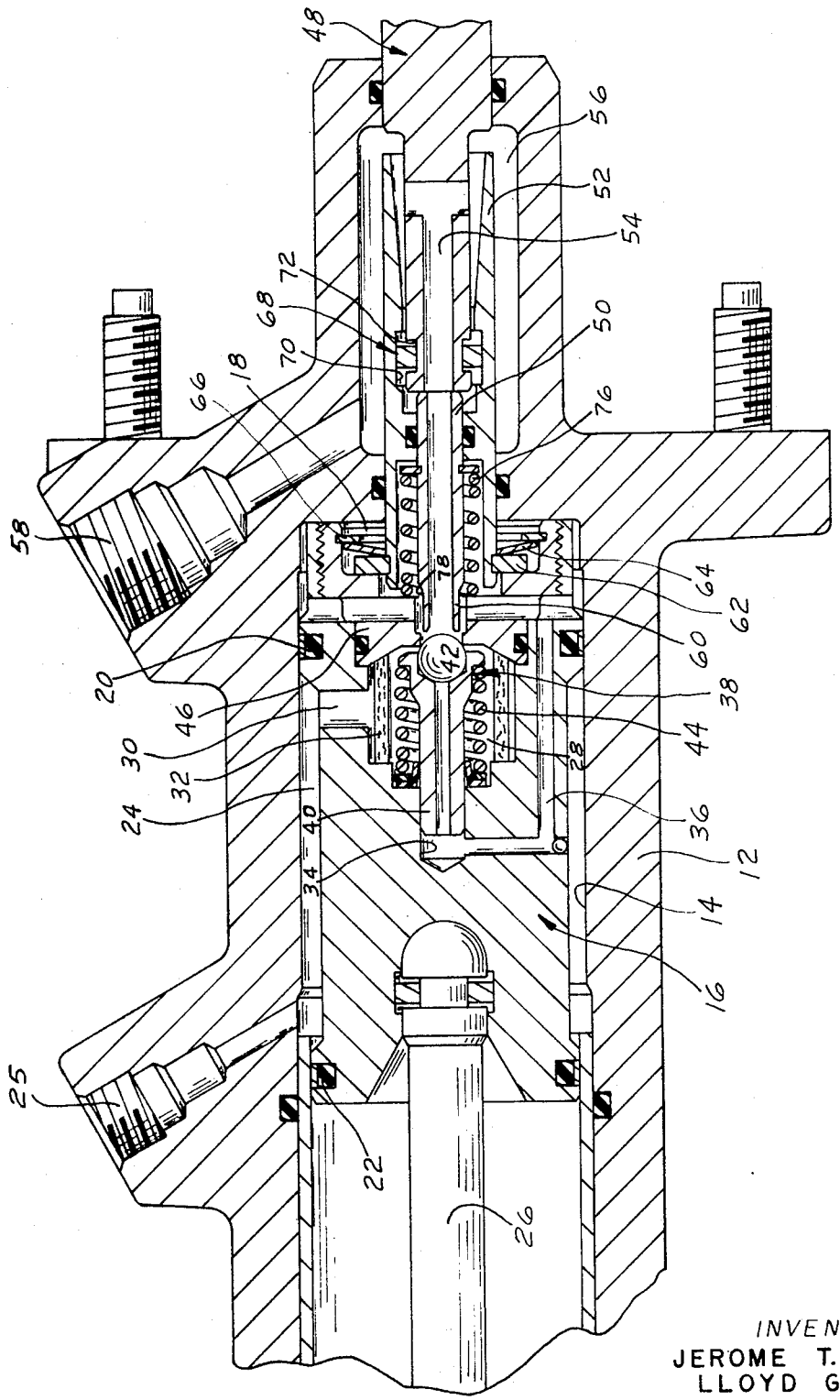
INVENTORS
JEROME T. EWALD
LLOYD G. BACH
BY Ken C. Decker
ATTORNEY

CLOSED CENTER BOOSTER WITH TWO-STAGE HYDRAULIC REACTION

BACKGROUND OF THE INVENTION

This invention relates to a hydraulic brake booster.

In any commercially acceptable power braking device, a portion of the braking force developed in the booster must be transmitted to the vehicle operator to provide braking "feel". All existing vacuum power brake units provide a two-stage or "delayed" reaction in which very little reaction force is transmitted to the vehicle operator until the braking force developed in the booster reaches a predetermined level. After this predetermined level of braking force is attained, a reaction force is transmitted to the vehicle operator which is proportional to the braking force developed in the booster. However, existing vacuum boosters are expected to be replaced by hydraulic booster in the very near future, because of the latter's smaller size and lower weight. Since vehicle operators have become accustomed to the two-stage or "delayed" reaction provided by vacuum boosters, it is desirable to provide a similar feature in a hydraulic brake booster.

SUMMARY OF THE INVENTION

Therefore, an important object of our invention is to provide a hydraulic brake booster which transmits reaction forces to the vehicle operator similar to the forces transmitted by existing vacuum brake boosters.

Another important object of our invention is to provide a hydraulic brake booster which initially provides a very small or "light" braking reaction force, and thereafter produces a reaction force proportional to the braking force developed in the booster.

Another important object of our invention is to provide a hydraulic power braking unit having a two-stage or "delayed" reaction characteristic without substantially increasing the cost of the unit.

DESCRIPTION OF THE DRAWING

The sole FIGURE of the drawing is a cross-sectional view of a hydraulic brake booster made pursuant to the teachings of our present invention.

DETAILED DESCRIPTION

Referring now to the drawing, a brake booster 10 includes a housing 12 which defines a bore 14 therewithin. A piston generally indicated by the numeral 16 is slidably mounted in the bore 14 and cooperates with one end of the housing 12 to define a pressure chamber 18 therebetween. A pair of axially spaced seals 20, 22 carried by piston 16 slidably engage the wall of the bore 14. That portion of the outer circumferential surface of the piston 16 between the seals 20 and 22 is recessed, so that this surface cooperates with the wall of the bore 14 to define an annular chamber 24 therebetween. An inlet port 25 communicates the chamber 24 with a suitable source of hydraulic pressure (not shown). It will be noted that the diameter of the piston 16 at the seal 20 is slightly larger than the diameter of the piston at the seal 22. Therefore, fluid pressure in the chamber 24 yieldably urges the piston 16 toward the right, viewing the Figure, toward the brake release position. A connecting member 26 connects the other end of the piston 16 with a standard automotive master cylinder (not shown) mounted to the left of the housing 12. Movement of the piston 16 to the left developes pressure in the master cylinder in the normal manner for actuating the vehicle's brakes.

A fluid compartment 28 is provided within the piston 16 and is communicated to the annular chamber 24 by a passage 30. An annular filter 32 removes extraneous material from the fluid flowing into the chamber 28. A bore 34 communicates with one end of the compartment 28, and is also communicated with the pressure chamber 28 by a passage 36. A valve assembly generally indicated by the numeral 38 is disposed within the chamber 28, and includes a valve stem 40 which is slidably supported in the bore 34 and a sphere 42 which is carried on the other end of the stem 40. A spring 44 yieldably urges the sphere 42 into sealing engagement with a valve seat 46.

Brake booster 10 further includes an operator-operated control rod generally indicated by the numeral 48 which is adapted to urge the sphere 42 off the seat 46 when a brake application is effected by the vehicle operator. The control rod 48 comprises an inner member 50 and an outer piston-like member 52. The inner member 50 defines a passage 54 therewithin which communicates the chamber 18 with another annular chamber 56 defined within the booster 10 between the outer circumferential surface of the control rod 48 and the wall of the housing 12. An outlet port 58 communicates the chamber 56 with a reservoir or low pressure sump (not shown). One end 60 of the inner member 50 is adapted to sealingly engage the sphere 42 to close communication between the pressure chamber 18 and the chamber 56 when a brake application is effected and thereafter urges the sphere 42 away from the seat 46 to admit fluid pressure into the chamber 18. The other end of the inner member 50 (not shown) is connected to the usual brake pedal mounted in the operator's compartment of the vehicle.

One end of the outer member 52 extends into the pressure chamber 18 and is provided with an abutment 62 which is yieldably urged into engagement with the front face of the piston 16 by a Belleville washer 64 disposed between the abutment 62 and a ring 66 carried by the piston 16. Force transmitting means generally indicated by the numeral 68 interconnects the inner and outer members 50 and 52. Force transmitting means 68 includes an inwardly facing recess 70 on the inner circumferential surface of the outer member 52 and a corresponding recess 72 in the outer circumferential surface of the inner member 50. A ring abutment 74 is carried in the recess 72 and projects into the recess 70. However, since the axial length of the recess 70 is substantially longer than that of the ring 74, relative movement of the outer member 52 with respect to inner member 50 is permitted until the end of the recess 70 engages the ring 74. Thereafter, any force exerted on the outer member 52 will be transmitted to the vehicle operator through the inner member 50 and the abutment ring 74 after the outer member 52 is urged into engagement with abutment 74. A spring 76 yieldably urges the inner member 50 to the right viewing the Figure, toward the brake release position.

MODE OF OPERATION

The brake booster 10 is illustrated in the Figure with the various components thereof disposed in the positions which they assume when the brakes of the vehicle are released. In this position, the end 60 of the inner member 50 is spaced from the sphere 42 so that the pressure chamber 18 is communicated to the reservoir or sump (not shown) through the passage 54, the chamber 56 and the outlet port 58. The spring 44 urges the sphere 42 into sealing engagement with the seat 46 to prevent high pressure fluid from being communicated into the chamber 18. However, since the diameter of the piston 16 at the seal 20 is greater than the diameter of the piston 16 at the seal 22, high pressure fluid in the chamber 24 maintains the end of the piston against the end of the bore, so that no pressure is developed in the aforementioned master cylinder. The passage 36 maintains substantially the same pressures on opposite sides of the valve mechanism 38 so that only enough force need be applied to the latter to overcome the spring 44 to actuate the brake booster.

When the brakes of the vehicle are applied, the vehicle operator urges the control rod 48 to the left viewing the Figure. End 60 of the inner member 50 first sealingly engages the sphere 42, thereby terminating fluid communication between the pressure chamber 18 and the outlet port 58. As the control rod 48 is moved further to the left, the sphere 42 is urged away from the valve seat 46, to permit high pressure fluid in the chamber 28 to be communicated into the pressure chamber 18. High pressure fluid in the chamber 18 acting across the end of the piston 16 urges the latter to the left viewing the Figure. This movement of the piston is transmitted to the aforementioned master cylinder by the connecting rod 26 to develop pressure in the master cylinder (not shown) in the normal manner.

Since substantially the same pressures are communicated to opposite sides of the valve mechanism 38 by the passage 36 and bore 34, the only force required of the vehicle operator to actuate the brake booster 10 is the force required to overcome the force of the spring 44. Since the left hand end of the outer member 52 is exposed to the fluid pressure in the pressure chamber 18, outer member 52 will be urged to the right as the pressure level in the pressure chamber 18 increases. At some predetermined level, the force of fluid pressure in the chamber 18 acting against the end of the outer member 52 will be sufficient to overcome the force exerted on the member 52 by the Belleville washer 64 urging the latter into engagement with the piston 16. When this occurs, the outer member 52 moves away from the piston 16, to the right viewing the Figure, until the end of the recess 70 engages the abutment ring 74. When this occurs, the force due to fluid pressure in the pressure chamber 18 acting upon the left hand end of the outer member 52 will be transmitted to the vehicle operator through the abutment ring 74 and the inner member 50. Thereafter, an increasingly greater reaction force will be felt by the vehicle operator. This increased force will be proportional to the fluid pressure level developed in the pressure chamber 18.

As described above, essentially no reaction force is transmitted to the vehicle operator until the fluid pressure level in the pressure chamber 18 attains a predetermined value sufficient to overcome the resiliency of the Belleville washer 64. This permits sufficient fluid force to be generated in the pressure chamber 18 to develop a sufficient braking force in the master cylinder to overcome the effects of the shoe return springs in the vehicle's brakes. After a braking force is generated in the vehicle's brakes, a reaction force is transmitted to the vehicle operator which is proportional to the braking force developed in the brakes. Of course, it is obvious that some small initial reaction force may be provided if required, by simply providing some unbalanced area on the inner member 50 which is exposed to fluid pressure in the pressure chamber 18, such as the shoulder 78 on the inner member 50. The fluid force thus transmitted to the vehicle operator will be proportional to the normal area of the shoulder 78 which is exposed to fluid pressure in the pressure chamber 18.

We claim:

1. In a brake booster:
a housing defining a bore therewithin in fluid communication with a fluid pressure source;
a piston slidably mounted in said bore and cooperating with one end of the housing to define a pressure chamber therebetween;
valve means carried by said piston for controlling fluid communication between the pressure source and the pressure chamber to shift said piston; and
operator-operated means for operating said valve means and for providing a reaction force to the operator, said operator-operated means including inner and outer members, resilient means disposed between one of said members and said piston yieldably urging said one member into engagement with said piston, said one member having a fluid pressure action surface exposed to the fluid pressure level in said chamber whereupon fluid pressure level in said chamber acts upon said reaction surface to yieldably urge said one member away from said piston in opposition to said resilient means, the other member being movable relative to said one member for a limited distance to actuate said valve means, force transmitting means carried by said members, said other member transmitting a relatively small reaction force to the operator until the fluid pressure developed in said pressure chamber acting on said reaction area is sufficient to overcome the resiliency of said resilient means, whereupon said one member moves away from said piston and said force transmitting means transfers the force generated on said reaction surface from said one member to the other member, whereupon the reaction force transmitted to the vehicle operator is proportional to the fluid pressure level developed in said pressure chamber;
said one member being the outer member, the other member being the inner member.

2. In a brake booster:
a housing defining a bore therewithin in fluid communication with a fluid pressure source;
a piston slidably mounted in said bore and cooperating with one end of the housing to define a pressure chamber therebetween;
valve means carried by said piston for controlling fluid communication between the pressure source, and the pressure chamber to shift said piston; and
operator-operated means for operating said valve means and for providing a reaction force to the operator, said operator-operated means including inner and outer members, resilient means disposed between one of said members and said piston yieldably urging said one member into engagement with said piston, said one member having a fluid pressure action surface exposed to the fluid pressure level in said chamber whereupon fluid pressure level in said chamber acts upon said reaction surface to yieldably urge said one member away from said piston in opposition to said resilient means, the other member being movable relative to said one member for a limited distance to actuate said valve means, force transmitting means carried by said members, said other member transmitting a relatively small reaction force to the operator until the fluid pressure developed in said pressure chamber acting on said reaction area is sufficient to overcome the resiliency of said resilient means, whereupon said one member moves away from said piston and said force transmitting means transfers the force generated on said reaction surface from said one member to the other member, whereupon the reaction force transmitted to the vehicle operator is proportional to the fluid pressure level developed in said pressure chamber;

said force transmitting means including a slot in said one member and an abutment carried by the other member projecting into said slot, said slot having an axial length greater than the axial length of the abutment whereby said one member is permitted to move relative to the other member until the end of the slot engages the abutment.

3. In a brake booster:

a housing defining a bore therewithin in fluid communication with a fluid pressure source;

a piston slidably mounted in said bore and cooperating with one end of the housing to define a pressure chamber therebetween;

valve means carried by said piston for controlling fluid communication between the pressure source, and the pressure chamber to shift said piston; and operator-operated means for operating said valve means and for providing a reaction force to the operator, said operator-operated means including inner and outer members, resilient means disposed between one of said members and said piston yieldably urging said one member into engagement with said piston, said one member having a fluid pressure action surface exposed to the fluid pressure level in said chamber whereupon fluid pressure level in said chamber acts upon said reaction surface to yieldably urge said one member away from said piston in opposition to said resilient means, the other member being movable relative to said one member for a limited distance to actuate said valve means, force transmitting means carried by said members, said other member transmitting a relatively small reaction force to the operator until the fluid pressure developed in said pressure chamber acting on said reaction area is sufficient to overcome the resiliency of said resilient means, whereupon said one member moves away from said piston and said force transmitting means transfers the force generated on said reaction force transmitted to the vehicle operator is proportional to the fluid pressure level developed in said pressure chamber;

said resilient means exerting a substantially constant force on said one member until the fluid pressure level acting on said abutment surface overcomes the force of said resilient means, whereupon the latter yields;

said resilient means being a Belleville washer.

* * * * *